(12) United States Patent
Greenfield et al.

(10) Patent No.: US 11,002,193 B2
(45) Date of Patent: May 11, 2021

(54) FUEL INJECTOR SYSTEMS AND SUPPORT STRUCTURES

(71) Applicant: Delavan Inc., West Des Moines, IA (US)

(72) Inventors: Jacob Greenfield, Granger, IA (US); Jason A. Ryon, Carlisle, IA (US); Lev Alexander Prociw, Johnston, IA (US)

(73) Assignee: Delavan Inc., West Des Moines, IA (US)

( * ) Notice: Subject to any disclaimer, the term of this patent is extended or adjusted under 35 U.S.C. 154(b) by 487 days.

(21) Appl. No.: 15/844,282

(22) Filed: Dec. 15, 2017

(65) Prior Publication Data

US 2019/0186364 A1    Jun. 20, 2019

(51) Int. Cl.
   *F02C 7/22*     (2006.01)
   *F23R 3/34*     (2006.01)
   *F02C 7/20*     (2006.01)
   *F02C 7/28*     (2006.01)

(52) U.S. Cl.
   CPC ............... *F02C 7/222* (2013.01); *F02C 7/20* (2013.01); *F02C 7/28* (2013.01); *F23R 3/34* (2013.01); *F23R 3/343* (2013.01); *F05D 2230/60* (2013.01); *F05D 2240/14* (2013.01); *F05D 2240/35* (2013.01); *F05D 2240/55* (2013.01); *F05D 2250/75* (2013.01); *F05D 2260/941* (2013.01); *F23R 2900/00005* (2013.01); *F23R 2900/00018* (2013.01)

(58) Field of Classification Search
   CPC ................ F02C 7/222; F23R 3/10–14; F23R 3/28–286; F23R 3/46; F23R 2900/00017
   See application file for complete search history.

(56) References Cited

U.S. PATENT DOCUMENTS

| 2,992,531 | A | * | 7/1961 | Hershey | F23D 17/00 60/742 |
| 3,548,592 | A | * | 12/1970 | Hopkins | F23Q 3/008 60/39.827 |
| 3,763,650 | A | * | 10/1973 | Hussey | F23D 11/104 60/39.463 |
| 4,898,001 | A | * | 2/1990 | Kuroda | F23R 3/04 60/733 |

(Continued)

FOREIGN PATENT DOCUMENTS

WO    2017002076 A1    1/2017

OTHER PUBLICATIONS

Extended European Search Report, Application No. 18213176.3, dated Feb. 18, 2019.

*Primary Examiner* — Gerald L Sung
*Assistant Examiner* — Rene D Ford
(74) *Attorney, Agent, or Firm* — Locke Lord LLP; Daniel J. Fiorello; Scott D. Wofsy

(57) ABSTRACT

A turbomachine fuel injector system includes an air distributor configured to be mounted to and contained within a casing and to provide air to mix with a fuel from one or more fuel distribution systems. The system includes a fuel manifold configured to be mounted indirectly to the casing such that the fuel manifold system is contained within the casing but is independent such that fuel manifold does not touch or directly mount to either an interior of the casing or touch the air distributor within the casing to prevent or reduce thermal transfer from the air distributor to the fuel manifold.

13 Claims, 6 Drawing Sheets

(56) References Cited

U.S. PATENT DOCUMENTS

| | | | |
|---|---|---|---|
| 5,125,227 A * | 6/1992 | Ford | F23R 3/26 60/39.23 |
| 2004/0211186 A1 | 10/2004 | Stuttaford et al. | |
| 2005/0257530 A1 * | 11/2005 | Zupanc | F23R 3/14 60/776 |
| 2007/0137218 A1 * | 6/2007 | Prociw | F23R 3/283 60/796 |
| 2010/0018208 A1 * | 1/2010 | Ritland | F02C 7/222 60/737 |
| 2010/0018210 A1 * | 1/2010 | Fox | F23R 3/16 60/746 |
| 2010/0071377 A1 | 3/2010 | Fox et al. | |
| 2010/0139238 A1 * | 6/2010 | Hall | F23R 3/283 60/39.463 |
| 2010/0192584 A1 * | 8/2010 | Terada | F02C 7/228 60/739 |
| 2011/0067402 A1 * | 3/2011 | Wiebe | F23R 3/283 60/740 |
| 2012/0047900 A1 * | 3/2012 | Bottcher | F02C 7/222 60/739 |
| 2012/0291446 A1 * | 11/2012 | Hirata | F23R 3/04 60/772 |
| 2013/0055720 A1 * | 3/2013 | Fox | F02C 7/222 60/746 |
| 2014/0090389 A1 | 4/2014 | Stuttaford et al. | |
| 2014/0216038 A1 * | 8/2014 | Keener | F23R 3/283 60/737 |

* cited by examiner

FUEL INJECTOR SYSTEMS AND SUPPORT STRUCTURES

BACKGROUND

1. Field

The present disclosure relates to turbomachines, more specifically to turbomachine fuel injector systems (e.g., such as for industrial turbomachines having integral nozzles and combustors).

2. Description of Related Art

Combustion systems undergo extreme thermal stresses due to hot and cold components interacting. Traditional systems allow such interactions to exist.

Such conventional methods and systems have generally been considered satisfactory for their intended purpose. However, there is still a need in the art for reduction or elimination of thermal stresses due to hot and cold components interacting. The present disclosure provides a solution for this need.

SUMMARY

A turbomachine fuel injector system includes an air distributor configured to be mounted to and contained within a casing and to provide air to mix with a fuel from one or more fuel distribution systems. The system includes a fuel manifold configured to be mounted indirectly to the casing such that the fuel manifold system is contained within the casing but is independent such that fuel manifold does not touch or directly mount to either an interior of the casing or touch the air distributor within the casing to prevent or reduce thermal transfer from the air distributor to the fuel manifold.

The fuel manifold can be mounted to an adapter plate that is external to the casing, wherein the adapter plate mounts to the casing. The fuel manifold includes one or more fuel distribution systems configured to effuse fuel in a wide area.

Each fuel distribution system can be connected to at least one branch of the fuel manifold that extends from a base portion of the fuel manifold. The at least one branch can extend from the base portion of the fuel manifold through a first opening in the air distributor, traverse an axial distance, and then extend back through a second opening of the air distributor to connect to the fuel distribution system.

The air distributor can be attached to the casing through the clearance holes of the adapter plate such that air distributor fasteners do not touch the adapter plate. The air distributor can include a c-seal (or any other suitable seal) at each interface of an interior surface of the casing and the air distributor where the air distributor is attached to the casing to prevent high pressure flow from leaking through the casing.

In certain embodiments, the adapter plate can be mounted to the casing radially outwardly from where the fuel manifold is mounted to the adapter plate. The adapter plate can include a cutout to allow fuel manifold inlet fittings to pass therethrough.

The fuel manifold can be sealed to the casing with a manifold seal to prevent high pressure flow from leaking past the fuel manifold through the casing, and through the cutout of the adapter plate. The manifold seal can be a c-seal or any other suitable seal.

The air distributor can include a support structure which mounts to the casing and which is attached to and supports one or more air inlets. A combustor shroud can be attached to an axial end of the one or more air inlets. In certain embodiments, the fuel manifold can be brazed to be a single piece.

A method for assembling a turbomachine fuel injector system can include attaching a support structure of an air distributor to a casing, inserting a fuel manifold into the casing such that the fuel manifold extends through the casing but is sealed to the casing, and such that the fuel manifold is partially within the support structure, attaching the fuel manifold to an adapter plate external of the casing, attaching the adapter plate to the casing, attaching one or more air inlets to the support structure to complete the air distributor within the casing such that the air distributor encages at least a portion of the fuel manifold. The method can include brazing the fuel manifold to be a single piece. The method can also include attaching a combustor shroud to an axial end of the one or more air inlets.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
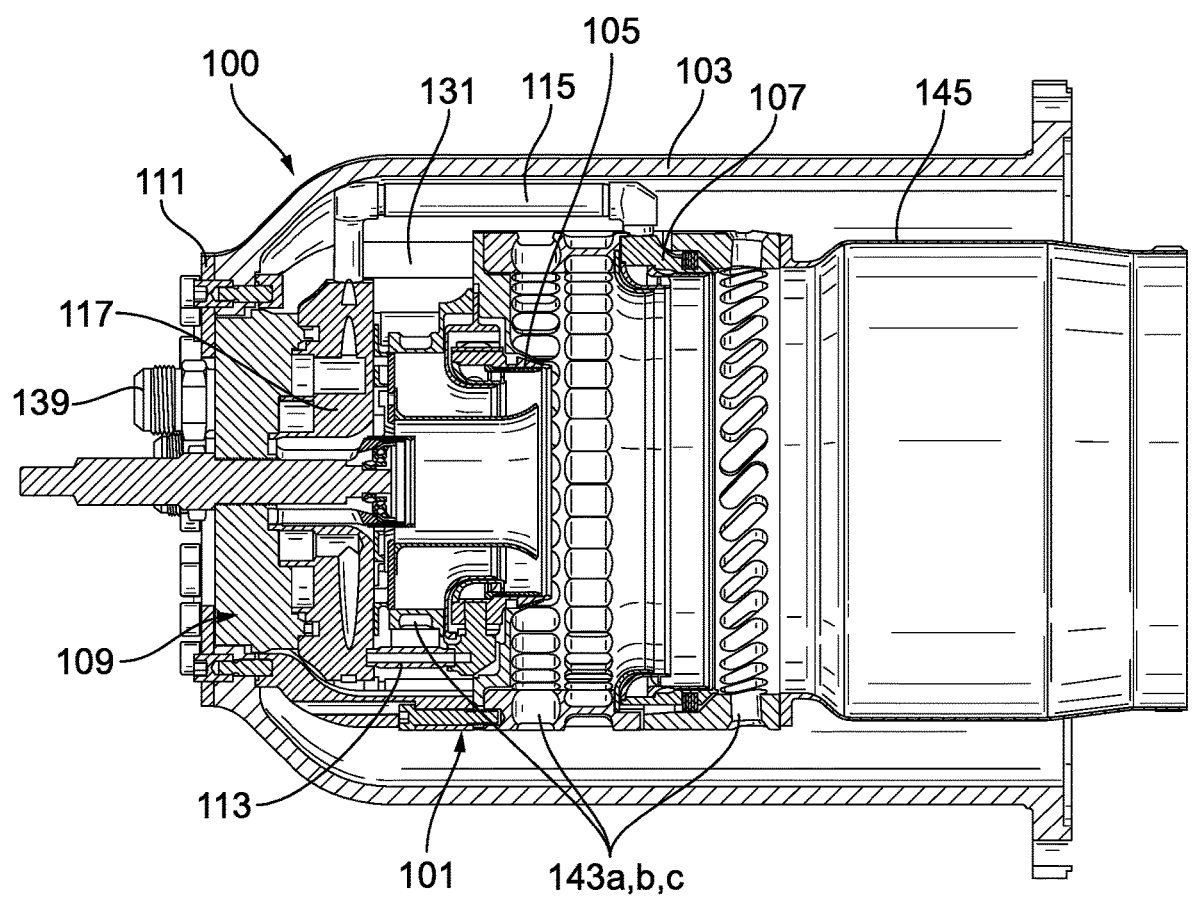
FIG. 1 is a is a cross-sectional view of an embodiment of a turbomachine fuel injection system in accordance with this disclosure, shown having integrated fuel distribution systems and a combustor shroud.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-6.

Referring to FIG. 1, a turbomachine fuel injector system 100 includes an air distributor 101 configured to be mounted to and contained within a casing 103 and to provide air to mix with a fuel from one or more fuel distribution systems 105, 107. The air distributor 101 can include one or more air inlets as described herein to allow radial air flow inward in the fuel distribution systems as described herein.

The system 100 includes a fuel manifold 109 configured to be mounted indirectly to the casing 103 such that the fuel manifold 109 is contained at least partly within the casing 103 but is independent such that fuel manifold 109 does not touch or directly mount to either an interior of the casing 103 or touch the air distributor 101 within the casing 103 to prevent or reduce thermal transfer from the air distributor 101 to the fuel manifold 109.

The fuel manifold 109 can be mounted to an adapter plate 111 that is external to the casing 103. The adapter plate 111 can mount to the casing 103 and thus only indirectly mount the fuel manifold to the casing 103. The adapter plate 111 can be made of any suitable material, e.g., a material with relatively low thermal conductivity (e.g., a ceramic, polymer, an alloy) as appreciated by those having ordinary skill in the art, or any other material (e.g., metal).

The fuel manifold 109 includes one or more fuel distribution systems 105, 107 (e.g., fuel nozzles) configured to effuse fuel in a wide area to mix with air. The fuel distribution systems can include any suitable construction as appreciated by those having ordinary skill in the art.

Each fuel distribution system 105, 107 can be connected to at least one branch 113, 115 of the fuel manifold 109 that extends from a base portion 117 of the fuel manifold 109.

Figure 2:
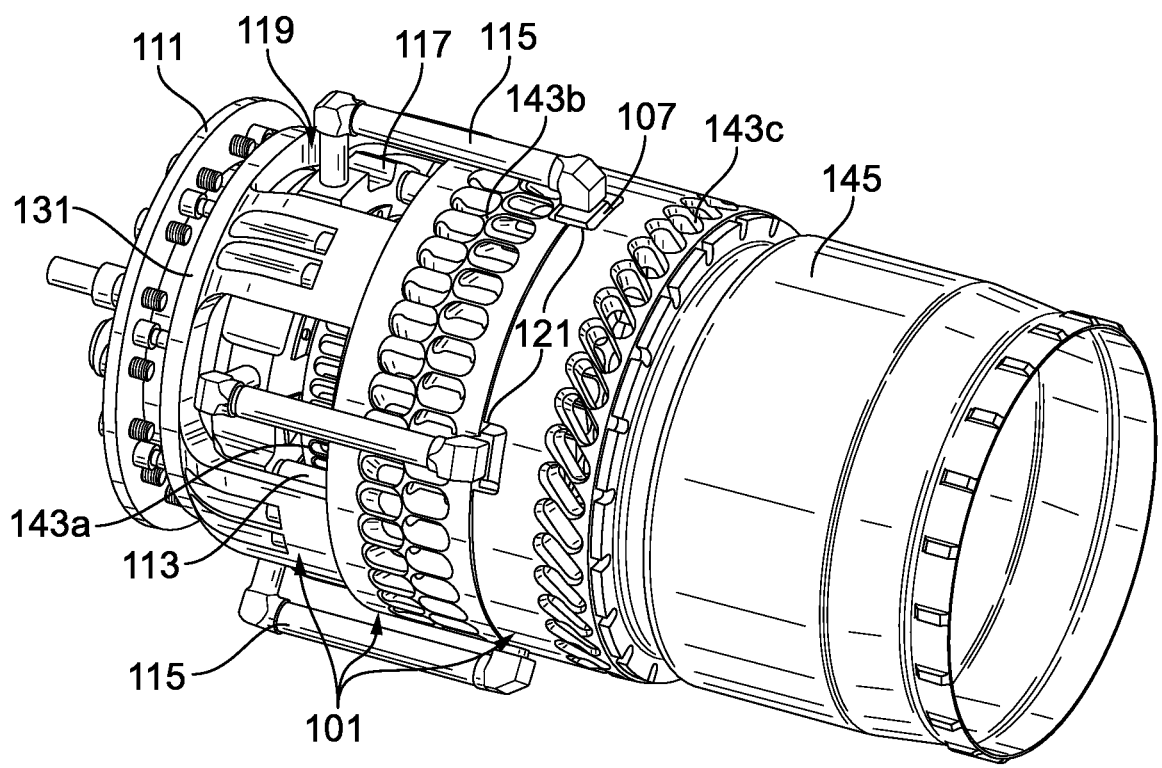
FIG. 2 is a perspective view of the embodiment of FIG. 1 having the casing removed.

Referring additionally to FIG. 2, the at least one branch 115 can extend from the base portion 117 of the fuel manifold 109 through a first opening 119 (e.g., shown in FIG. 2) in the air distributor 101, traverse an axial distance, and then extend back through a second opening 121 of the air distributor 101 to connect to the fuel distribution system 107.

Figure 3:
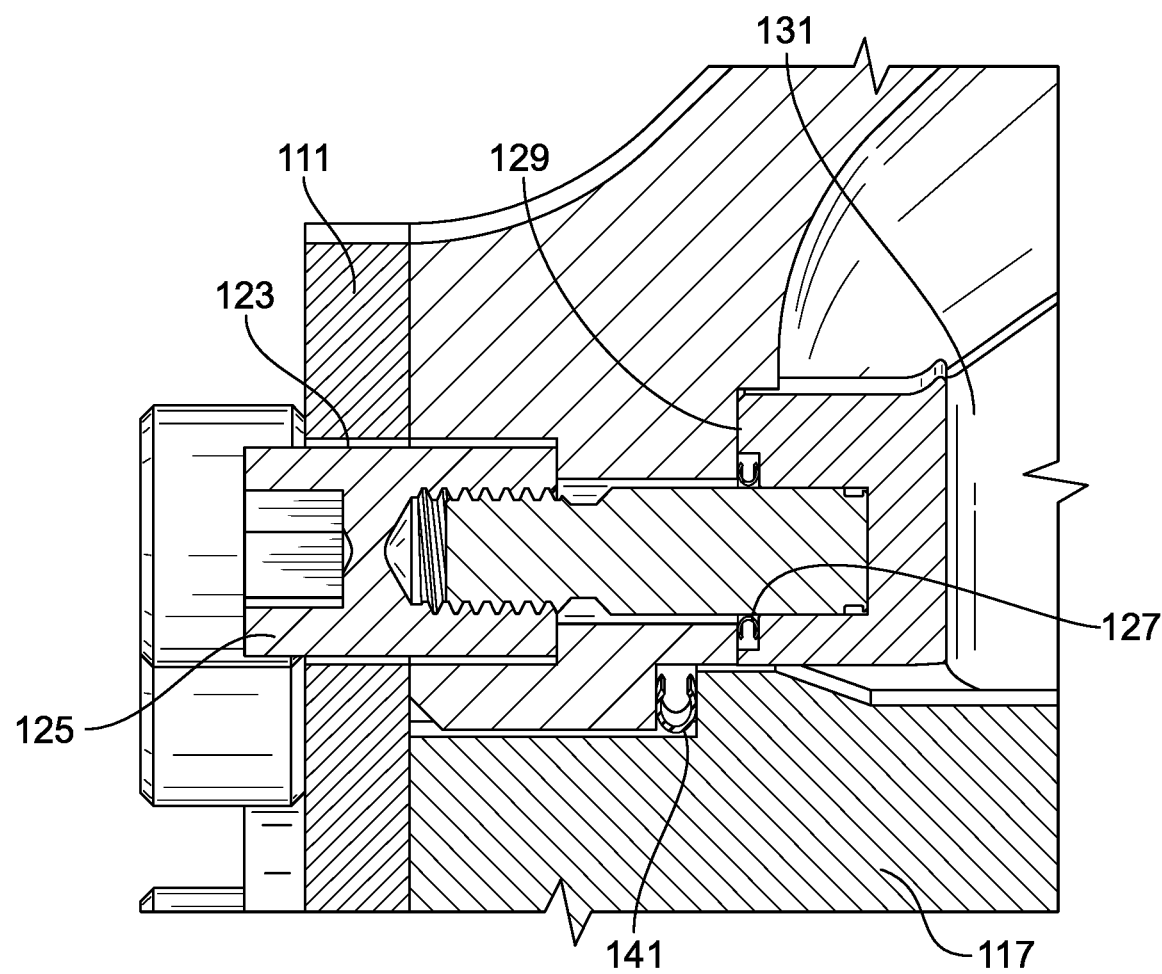
FIG. 3 is a partial cross-sectional view of the embodiment of FIG. 1, showing the attachment of the support structure to the casing.
Figure 4:
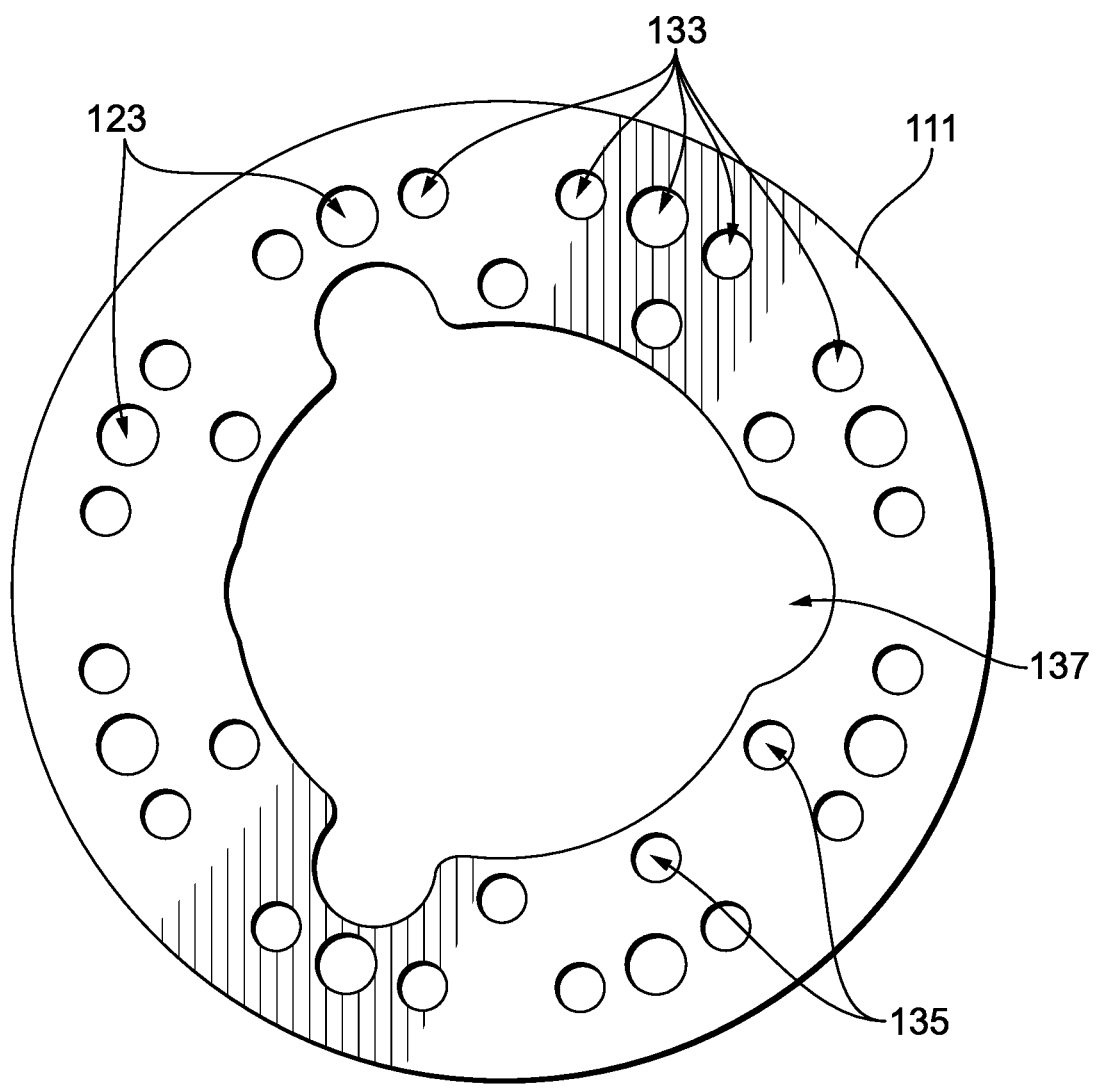
FIG. 4 is a plan view of an embodiment of an adapter plate in accordance with this disclosure.
Figure 5:
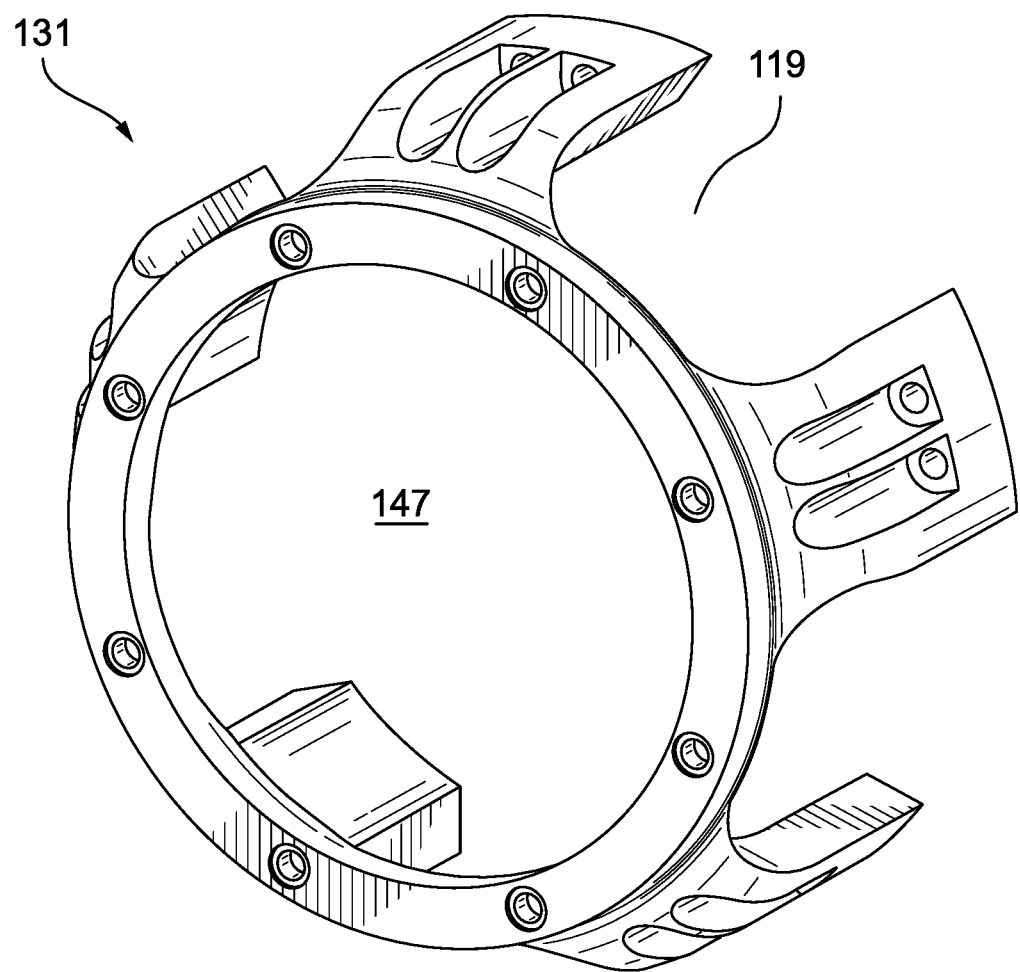
FIG. 5 is a perspective view of a support structure in accordance with this disclosure.
Figure 6:
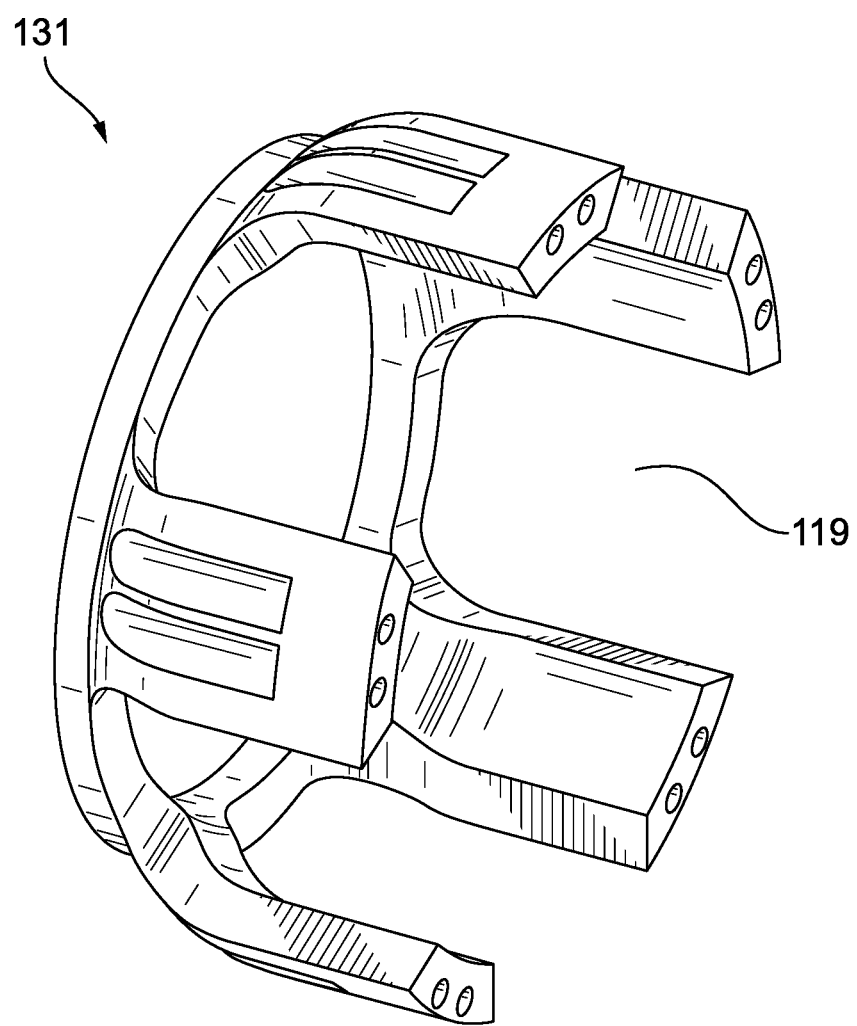
FIG. 6 is a perspective view of the embodiment of FIG. 5.

Referring additionally to FIGS. 3 and 4, and as shown in FIG. 2, the air distributor 101 can be attached to the casing 103 through the clearance holes 123 of the adapter plate 111 such that air distributor fasteners 125 do not touch the adapter plate 111. As shown in FIG. 3, the air distributor 101 can include a c-seal 127 (or any other suitable seal) at each interface of an interior surface of the casing 103 and the air distributor 101 (e.g., at support structure 131) where the air distributor 101 is attached to the casing 103 to prevent high pressure flow from leaking through the casing 103.

In certain embodiments, the adapter plate 111 can be mounted to the casing 103 (e.g., at casing mount holes 133) radially outwardly from where the fuel manifold 109 is mounted to the adapter plate 111 (e.g., at manifold mount holes 135). The adapter plate 111 can include a cutout 137 to allow fuel manifold inlet fittings 139 to pass therethrough.

The fuel manifold 109 can be sealed to the casing 103 with a manifold seal 141 (e.g., disposed in a groove between manifold 109 and casing 103) to prevent high pressure flow from leaking past the fuel manifold 109 through the casing 103, and through the cutout 137 of the adapter plate 111. The manifold seal 141 can be a c-seal or any other suitable seal (e.g., that increases sealing action with differential pressure).

As mentioned above, referring additionally to FIGS. 5 and 6, the air distributor 101 can include a support structure 131 which mounts to the casing 103 and which is attached to and supports one or more air inlets 143a, b, c of the air distributor 101. The support structure 131 can include an opening 147 to allow fittings 139 to pass therethrough.

The air inlets 143a, b, c can include any suitable inlet (e.g., an air swirler and/or other suitable mixer). In certain embodiments, a combustor shroud 145 can be attached to an axial end of the one or more air inlets (e.g., at air inlet 143c).

In certain embodiments, the fuel manifold 109 can be brazed to be a single piece. The air distributor 101 can be assembled in multiple pieces and/or fastened together in any suitable manner.

In accordance with at least one aspect of this disclosure a method for assembling a turbomachine fuel injector system can include attaching a support structure of an air distributor to an interior of a casing, inserting a fuel manifold into the casing such that the fuel manifold extends through the casing but is sealed to the casing, and such that the fuel manifold is partially within the support structure, attaching the fuel manifold to an adapter plate external of the casing, attaching the adapter plate to the casing, attaching one or more air inlets to the support structure to complete the air distributor within the casing such that the air distributor encages at least a portion of the fuel manifold. The method can include brazing the fuel manifold to be a single piece. The method can also include attaching a combustor shroud to an axial end of the one or more air inlets.

As described above, embodiments of an adapter plate allow both the fuel manifold, which is relatively cold in operation, and the support structure, which is relatively hot in operation, to mount to the case. Accordingly, embodiments a hot section is attached to case through the adapter plate without contacting the adapter plate. The hot sections can also rest on the surface inside the case to support radial load in certain embodiments. As shown, hot section support structure 131 can attach to other hot components (e.g., air inlets and combustor shroud) in any suitable way such as bolting, brazing, or welding.

As disclosed, the hot section is independent (not physically attached) anywhere to the cold section of system 100. Air seals can restrict leaks as hot parts grow radially/axially away from the cold section. Embodiments include cold fuel transfer branches that pass through hot section and then back through again. In certain embodiments, a plate and spring washer can mount and cover each openings 121 to prevent air leak.

Accordingly, to isolate the hot components, e.g., air distributor 101 (e.g., air swirlers, air straighteners), heat shields disposed within the fuel distribution systems 105, 107, and/or the combustor 145, from the cold components (e.g., fuel manifold 109, transfer tubes 113, 115, and fuel distribution systems 105, 107), embodiments provide structural support for both component assemblies back to the external case. Fuel distributers are attached to the fuel manifold and completely support the fuel distributers.

Embodiments isolate the hot components from the cold components to reduce stresses within the assembly. Lower stresses can lead to longer life of the component and lower risk of the components failing.

Any suitable combination(s) of any disclosed embodiments and/or any suitable portion(s) thereof is contemplated therein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A turbomachine fuel injector system, comprising:
an air distributor configured to be mounted to and contained within a casing and to provide air to mix with a fuel from one or more fuel distribution systems; and a fuel manifold configured to be mounted indirectly to the casing such that the fuel manifold is contained within the casing but is independent such that the fuel manifold does not touch or directly mount to either an interior of the casing or the air distributor within the casing to prevent or reduce thermal transfer from the air distributor to the fuel manifold, wherein the fuel manifold is mounted to an adapter plate that is external to the casing, wherein the adapter plate mounts to the casing, wherein the fuel manifold includes one or more fuel distribution systems configured to effuse fuel, wherein each of the one or more fuel distribution systems is connected to at least one branch of the fuel manifold that extends from a base portion of the fuel manifold, wherein the at least one branch extends from the base portion of the fuel manifold through a first opening in the air distributor, traverses an axial distance, and then extends back through a second opening of the air distributor to connect to a respective one of the one or more fuel distribution systems.

2. The system of claim 1, wherein the adapter plate includes clearance holes sized and configured to prevent contact between the adapter plate and fasteners that attach the air distributor to the casing.

3. The system of claim 2, wherein the air distributor includes a c-seal at each interface of an interior surface of the casing and the air distributor where the air distributor is attached to the casing to prevent high pressure flow from leaking through the casing.

4. The system of claim 1, wherein the adapter plate is mounted to the casing radially outwardly from where the fuel manifold is mounted to the adapter plate.

5. The system of claim 1, wherein the adapter plate includes a cutout to allow fuel manifold inlet fittings to pass therethrough.

6. The system of claim 5, wherein the fuel manifold is sealed to the casing with a manifold seal to prevent high pressure flow from leaking past the fuel manifold through the casing, and through the cutout of the adapter plate.

7. The system of claim 6, wherein the manifold seal is a c-seal.

8. The system of claim 1, wherein the air distributor includes a support structure which mounts to the casing and which is attached to and supports one or more air inlets.

9. The system of claim 1, wherein a combustor shroud is attached to an axial end of the one or more air inlets.

10. The system of claim 1, wherein the fuel manifold is brazed to be a single piece.

11. A turbomachine fuel injector system, comprising:
an air distributor configured to be mounted to and contained within a casing and to provide air to mix with a fuel from one or more fuel distribution systems; and
a fuel manifold configured to be mounted indirectly to the casing such that the fuel manifold is contained within the casing but is independent such that the fuel manifold does not touch or directly mount to either an interior of the casing or the air distributor within the casing to prevent or reduce thermal transfer from the air distributor to the fuel manifold,
wherein the fuel manifold is mounted to an adapter plate that is external to the casing, wherein the adapter plate mounts to the casing, wherein the adapter plate includes clearance holes sized and configured to prevent contact between the adapter plate and fasteners that attach the air distributor to the casing, wherein the air distributor includes a c-seal at each interface of an interior surface of the casing and the air distributor where the air distributor is attached to the casing to prevent high pressure flow from leaking through the casing.

12. A turbomachine fuel injector system, comprising:
an air distributor configured to be mounted to and contained within a casing and to provide air to mix with a fuel from one or more fuel distribution systems; and
a fuel manifold configured to be mounted indirectly to the casing such that the fuel manifold is contained within the casing but is independent such that the fuel manifold does not touch or directly mount to either an interior of the casing or the air distributor within the casing to prevent or reduce thermal transfer from the air distributor to the fuel manifold,
wherein the fuel manifold is mounted to an adapter plate that is external to the casing, wherein the adapter plate mounts to the casing, wherein the adapter plate includes a cutout to allow fuel manifold inlet fittings to pass therethrough, wherein the fuel manifold is sealed to the casing with a manifold seal to prevent high pressure flow from leaking past the fuel manifold through the casing, and through the cutout of the adapter plate.

13. The system of claim 12, wherein the manifold seal is a c-seal.

* * * * *